United States Patent [19]

Jones

[11] Patent Number: 5,492,430

[45] Date of Patent: Feb. 20, 1996

[54] TELESCOPIC TUBES LOCKING DEVICE

[75] Inventor: Darrell L. Jones, Ojai, Calif.

[73] Assignee: Carl A. Hammoms, Escondido, Calif.; a part interest

[21] Appl. No.: 322,465

[22] Filed: Oct. 14, 1994

[51] Int. Cl.⁶ ........................................ F16B 7/10
[52] U.S. Cl. ...................... 403/109; 403/377; 403/325; 248/188.5
[58] Field of Search .................. 403/377, 378, 403/376, 109, 104, 325, 321, 327, 322, 367, 368, 373, 374, 83; 285/302, 326; 248/407, 408, 188.5, 161, 163.1, 157, 412

[56] References Cited

U.S. PATENT DOCUMENTS

| | | | |
|---|---|---|---|
| 2,184,358 | 12/1939 | Moore | 248/191 |
| 2,430,649 | 11/1947 | Schulz | 248/188.5 |
| 2,455,525 | 12/1948 | Schulz | 403/104 X |
| 3,480,247 | 11/1909 | Waner | 403/377 X |
| 3,491,614 | 1/1970 | Saunders et al. | 74/493 |
| 4,169,687 | 10/1979 | Schull | 403/109 |
| 4,180,346 | 12/1979 | Blake | 403/109 |
| 4,234,151 | 11/1980 | John et al. | 248/412 X |
| 4,757,778 | 7/1988 | Scaglia | 114/97 |
| 4,900,182 | 2/1990 | Stillwagon | 403/325 |
| 5,011,104 | 4/1991 | Fang | 403/104 X |
| 5,141,355 | 8/1992 | Stillwagon | 403/325 |

Primary Examiner—Blair M. Johnson
Assistant Examiner—Harry C. Kim
Attorney, Agent, or Firm—Jack C. Munro

[57] ABSTRACT

A locking device for a pair of telescopic tubes which assumes a locked position when the tubes are at rest. The locking device comprises a housing mounted around the telescopic tubes. Located interiorly of the housing is an end fitting and a collet with the collet being tightly pressed into engagement with the inner tube when the housing is in a retracted position. Longitudinal movement of the housing to an extended position will free the collet from the end fitting thereby permitting telescopic sliding movement of the tubes.

8 Claims, 1 Drawing Sheet

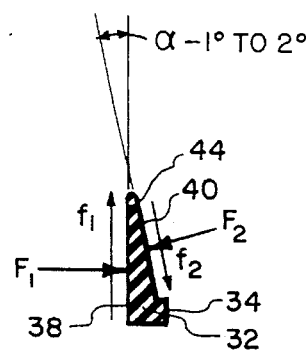
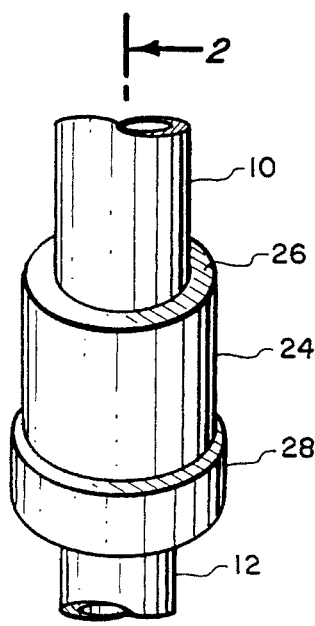
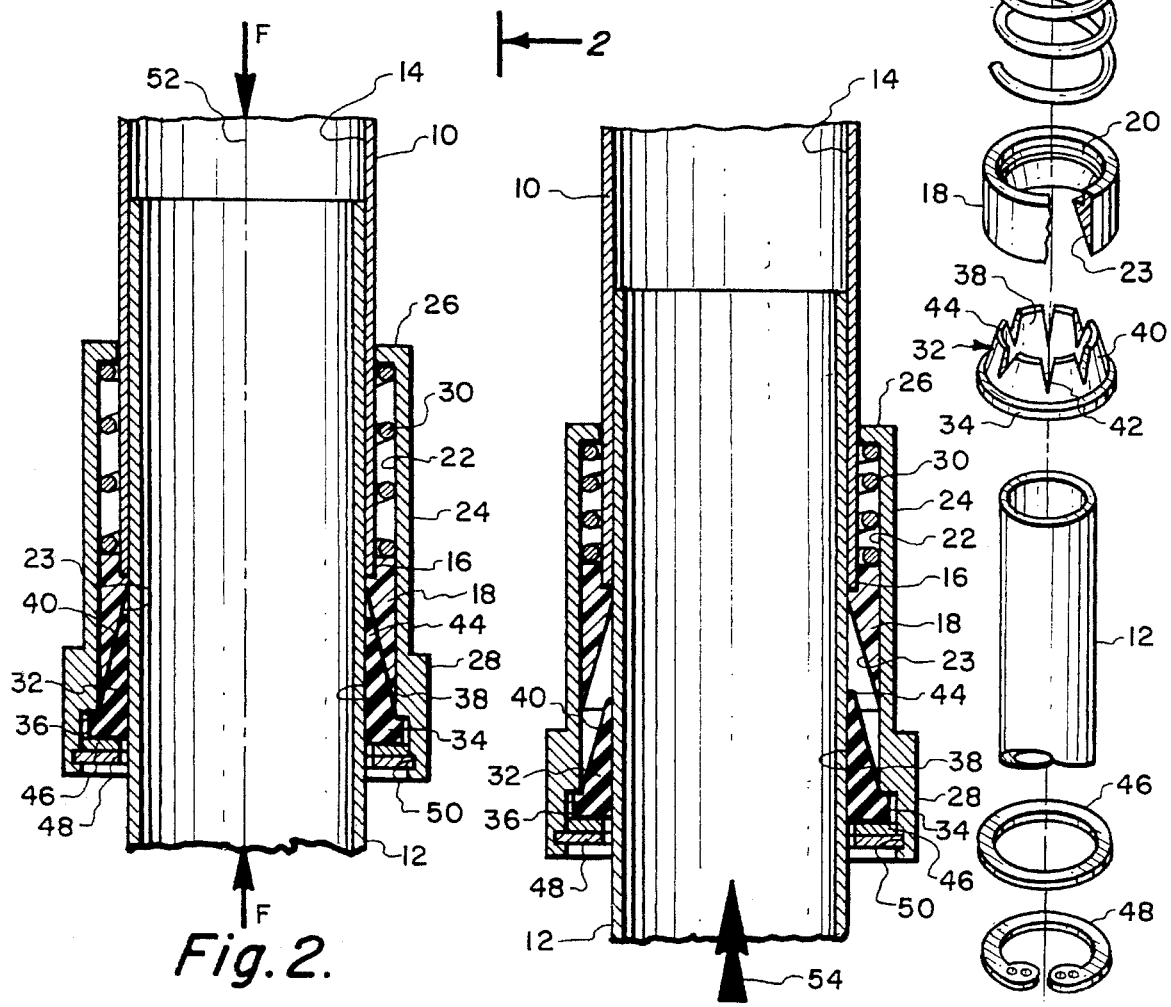
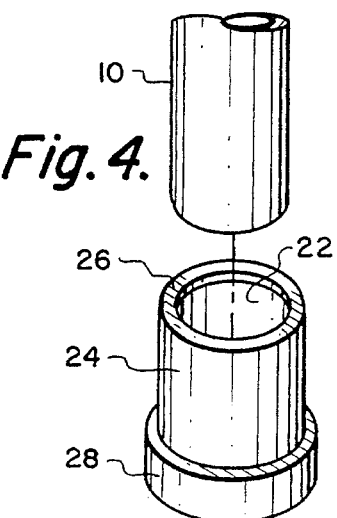
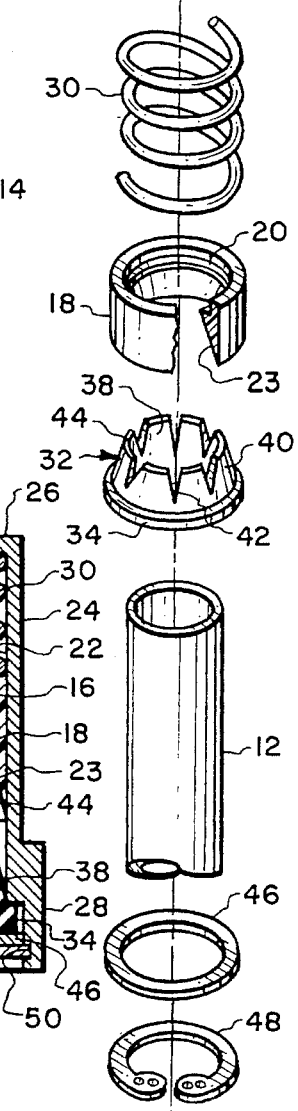

TELESCOPIC TUBES LOCKING DEVICE

BACKGROUND OF THE INVENTION

1. Field of the Invention

The field of this invention relates to locking devices for telescopic members and more particularly to a locking device which can be quickly and easily manually manipulated to unlock the telescopic members to permit longitudinal sliding movement therebetween.

2. Description of the Prior Art

Telescopic tubes are in exceedingly common use. Telescopic tubes are commonly used on tripods with these tripods being used in conjunction with cameras, telescopes, lighting equipment, surveying equipment, and so forth. Other usages for telescopic tubes are outer space structures, tent poles, music stands, scaffolding, microphone stands, antennas, table legs, and so forth.

The main purpose for using telescopic tubes is to permit the overall structure to collapse to a smaller configuration generally facilitating portability. When the telescopic tubes are extended, the device can assume a relatively long length to fit the length requirements of the various uses to which the instruments are to be put. In addition, in conjunction with photographic tripods and surveying equipment, it is common to increase or decrease the length of a telescopic tube arrangement for the purpose of achieving a particular positioning of the camera or the surveying tool. At times, this adjustment has to be exceedingly precise, especially in conjunction with surveying equipment. The surveying equipment may be used on uneven terrain and the different legs of the telescopic tubes varied in their lengths so as to locate the surveying tool at a precisely level position.

Within the prior art, to change the position of a pair of telescopic tubes, these tubes are provided with a coupling interconnecting the tubes. This coupling is to be tightened to secure together the tubes and then must be loosened to permit adjusting of the tubes. Such couplings typically employ threaded elements which are rotated in one direction for tightening and rotated in the opposite direction for loosening. Operation of these threaded elements proves to be cumbersome and time consuming, especially in situations where a quick adjustment of the telescopic tubes is required. Also, lever activated camming devices are commonly used also requiring multiple steps to achieve adjustment and locking.

SUMMARY OF THE INVENTION

The present invention comprises a housing which is slidingly mounted for movement between a retracted position and an extended position about the outer tube of a pair of telescopic tubes with there being an inner tube capable of being slidingly moved relative to an outer tube. Within the housing there is located a coil spring with this coil spring operating between the rear end of the housing and an end fitting. This end fitting is fixedly mounted on the open end of the outer telescopic tube. The fore end of the housing includes a collet which is mounted therein and fixed against longitudinal movement relative to the housing. This collet is constructed of an elastomeric material and is capable of being slightly deflected. The end fitting includes a conical surface with the collet also including a mating collet conical surface. The spring applies a continuous force tending to locate the housing in the retracted position at which time the collet is located in contact with the end fitting and pressed snugly against the inner tube thereby fixing the position of the inner tube relative to the outer tube. Manually moving of the housing to the extended positions the collet in a spaced relationship from the end fitting which then permits the telescopic movement between the inner tube and the outer tube.

The primary objective of the present invention is to construct a locking device for a pair of telescopic tubes that when in the at-rest position the tubes are normally locked against compressive loads and, upon the instituting of longitudinal movement of the device, longitudinal movement of the telescopic tubes is then permitted.

Another objective of the present invention is to construct a telescopic tubes locking device which will withstand high axial compressive loading up to the strength limits of the material construction of the tubes.

Another objective of the present invention is to construct a telescopic tubes locking device that can be made to be exceedingly small in size and lighter than all known prior art devices.

Another advantage of the present invention is to construct a telescopic tubes locking device which can be manufactured relatively inexpensively and therefore sold to the ultimate consumer at a relatively inexpensive price.

Another objective of the present invention is to construct a telescopic tubes locking device which permits for precise adjustment of the longitudinal position of the telescopic tubes permitting the device to be used in conjunction with high accuracy measuring equipment such as surveying equipment, cameras, and the like.

Another objective of this invention is to provide for adjustment of the telescopic tubes while the tubes are under load.

BRIEF DESCRIPTION OF THE DRAWING

FIG. 1 is an exterior isometric view of the telescopic tubes locking device of the present invention showing such mounted in conjunction with a pair of telescopic tubes;

FIG. 2 is a cross-sectional view taken along line 2—2 of FIG. 1 showing the telescopic tubes locking device in the locked position;

FIG. 3 is a cross-sectional view similar to FIG. 2 but showing the telescopic tubes locking device of this invention in the unlocked position;

FIG. 4 is an exploded isometric view of the telescopic tube locking device of the present invention; and FIG. 5 is a force diagram representation of the collet used in conjunction with the telescopic tubes locking device of the present invention.

DETAILED DESCRIPTION OF THE PREFERRED EMBODIMENT

Referring particularly to the drawing there is shown an outer telescopic tube 10 and an inner telescopic tube 12. The inner telescopic tube 12 is located within the internal chamber 14 of the tube 10 in a close fitting yet slidable manner. The outer tube 10 has an open end 16. Fixedly secured to the open end 16, as by adhesive or other conventional type of mechanical fastening means, is an end fitting 18. The end fitting 18 is basically in the shape of a ring and has an interior cylindrical surface 20 which is to be secured to the open end 16. The end fitting 18 also includes an interior conical surface 23. The angle of this conical surface 23 is to be defined as angle ($\alpha$) which is the angle between the conical surface 23 and the longitudinal center axis 52. The end fitting 18 is located in a close conforming manner within an internal chamber 22 of a housing 24. The housing 24 is basically a cylindrical sleeve which terminates at one end in a rear wall 26 and at an enlarged cap 28 at the forward portion of the housing 24. Located within the internal chamber 22 between the rear wall 26 and the end fitting 18 is confined a coil spring 30.

Fixedly mounted within the cap 28 is a collet 32. The collet 32 includes an enlarged flange 34. The enlarged flange 34 is mounted within a groove 36 of the cap 28. The collet 32 is to be constructed of an elastomeric material such as rubber or rubberized plastic. The collet 32 includes an interior cylindrical surface 38 and an outer conical surface 40. The collet 32 includes a series of longitudinally oriented, V-shaped slots 42. There can be any number of the slots 42 such as four to six in number or any other desirable number. The slots 42 divide the collet 32 into a plurality of fingers 44. Each of the fingers 44 is capable of being deflected slightly toward the inner tube 12. The conical surface 40 is at angle a minus one to two degrees. For example, if angle $\alpha$ is fifteen degrees, the angle of the conical surface 40 will be thirteen to fourteen degrees relative to the center axis 52. Upon contact occurring between surfaces 40 and 23, the radial forces produced are located near the top of the fingers 44 rather than closer to enlarged flange 34. Deflection of the tip of the fingers 44 is easier than deflection at the middle of the fingers 44. This means that a lower amount of load is required to achieve the locking action.

Mounted directly against the outer surface of the flange 34 of the collet 32 is a washer 46. A lock ring 48 abuts against the washer 46 with the lock ring 48 being mounted within a groove 50 formed within the cap 28. It is a function of the lock ring 48 to securely hold in place the collet 32.

The housing 24 is capable of limited longitudinal axial movement in a direction parallel to the longitudinal center axis 52. The axis 52 is actually the coinciding longitudinal center axes of tubes 10 and 12. The movement of the housing 24 is from the retracted position to the extended position. Movement from the retracted position shown in FIG. 2 to the extended position shown in FIG. 3 is to be accomplished manually which will then permit the inner tube 12 to be moved longitudinally relative to the outer tube 10 in the direction of arrow 54. Regardless of whether the housing 24 is in the extended or retracted position, the inner tube 12 can always be moved in an extended or outward position which would be in a direction opposite of arrow 54.

It is to be noted that the spring 30 exerts a continuous bias tending to locate the rear wall 26 in the furthest spaced position from the end fitting. This positions the conical surface 40 in an abutting engagement with the conical surface 23. This causes a force $F_2$ to be applied against each of the fingers 44 with a reactive force $F_1$ to be applied from the inner tube 12 to the surface 38 of the collet 32. By proper designing of the angle $\alpha$ in conjunction with the elastomeric material of the collet 32 and the slots 42 which form the fingers 44 in view of the material of construction of the inner tube 12 and its coefficient of friction, the compressive load F between the tubes 10 and 12 will be resisted. In other words, regardless of the value of load F, the inner tube 12 will remain fixed relative to the outer tube 10. This locking action is produced by the transfer of force at the mating conical surfaces 23 and 40. These radial loads cause the conical fingers 44 to deflect inward in tight contact with the outer surface of the inner tube 12. The static friction force generated at this surface must be equal to or greater than the axial force F for the device of this invention to be self locking. The spring 30 is used to preload the locking device of this invention insuring initial contact between the collet 32 and the inner tube 12. The load of the spring 30 need only be sufficient to deflect the collet fingers 44 into contact with the inner tube 12.

In order for the device of this invention to be self locking, the friction force developed between the collet 32 and the inner tube 12 must be equal to or greater than the axial force F. For calculating the size of the angle a reference is to be had particularly to FIG. 5. The friction force $$f_1 = F_1 C_{f_1}$$

where $C_{f_1}$ equals the coefficient of friction between the collet 32 and the inner tube 12. The friction force $$f_2 = F_2 C_{f_2}$$

where $C_{f_2}$ equals the coefficient of friction between collet 32 and end fitting 18. In order to balance the vertical forces, $$f_1 = F_1 C_{f_1} = F_2 \sin \alpha + F_2 C_{f_2}(\cos \alpha).$$

In order to balance the horizontal forces, $$F_1 = F_2 \cos \alpha - F_2 C_{f_2}(\sin \alpha).$$

Dividing the first equation by the second equation, $$C_{f_1} = \frac{\sin\alpha + C_{f_2}(\cos\alpha)}{\cos\alpha - C_{f_2}(\sin\alpha)}.$$

This can be rearranged to $$\alpha = \tan^{-1}\frac{C_{f_1} - C_{f_2}}{1 + C_{f_1}C_{f_2}}$$

that is where $F = f_1$. If $F \leq f_1$, then the equation should read $$\alpha \leq \tan^{-1}\frac{C_{f_1} - C_{f_2}}{1 + C_{f_1}C_{f_2}}.$$

This relationship of $\alpha$ must exist in order for the device to be self locking. Angle $\alpha$ is the angle of the conical surface 23 relative to the longitudinal axis 52. $C_{f_1}$ equals the coefficient of friction between the outer surface of inner tube 12 and surface 38 of collet 32. $C_{f_2}$ is defined as the coefficient of friction between the conical surfaces 23 and 40.

As an example, if the material of construction for the inner tube 12 is a carbon fiber reinforced material and the collet 32 is a polyurethane elastomer, $C_{f_1}$ will be approximately equal to 0.5. If the material for the collet 32 comprises a polyurethane elastomer and the material of the end fitting 18 would be a hard plastic material such as commonly sold under the trademark of Delrin, the value for $C_{f_2}$ would be equal to 0.15. This would mean that the angle $\alpha$ should be fifteen degrees or less. The angle of surface 23 relative to axis 52 should be 15 degrees with the angle of surface 40 being 13 to 14 degrees.

It can thus be said that once the collet 32 is in contact with the end fitting, any axial force F applied attempting to further retract the legs 10 and 12 would be resisted by the friction forces developed between the collet 32 and the inner tube 12. Conversely, any axial load applied to the inner tube 12 to extend relative to the outer tube 10 will cause the collet 32 to tend to disengage from the end fitting 18, reducing the friction grip on the leg 12 and allowing the inner tube 12 to extend. Thus the telescopic tubes 10 and 12 can be extended by merely grasping the two tubes 10 and 12 and pulling them apart axially.

Another advantage of the device of this invention is that the tubes 10 and 12 can be collapsed or shortened ever so slightly by merely applying a light downward pressure on the housing 24 reducing the axial load on the collet 32 and decreasing the friction grip on the inner tube 12. As a result the tube 10, as well as the entire locking device, will slide ever so slowly relative to the inner tube 12 under easily controlled sliding friction so long as light manual pressure is maintained on the housing 24. Upon removal of this pressure, the tubes 10 and 12 will be immediately tightly locked together.

The device of this invention was originally conceived for use on tubes 10 and 12 that are constructed of composite materials. However, device 10 can certainly be used in conjunction with tubes 10 and 12 that are constructed of non-composite material such as aluminum, steel, wood and plastics. Also although cylindrical tubes 10 and 12 are shown in the drawing, the device of this invention can be adapted for non-circular tubes 10 and 12 such as square, hexagonal, octagonal as well as triangular. The device of this invention will withstand axial loading of the tubes 10 and 12 up to the strength limits of the material of construction of the tubes 10 and 12, collet 32 or end fitting 18. The inner tube 12 could also be a solid rod.

What is claimed is:

1. A telescopic tubes locking device comprising:

an inner tube, an outer tube, said inner tube and said outer tube having coinciding longitudinal center axes, said outer tube terminating in an open end, said inner tube being slidably mounted within said outer tube;

a housing, said housing located about said outer tube, said housing being slidably movable between an extended position and a retracted position on said outer tube in a direction along said longitudinal center axes, said housing having an internal annular chamber located about said outer tube;

an end fitting fixedly mounted on said outer tube at said open end, said end fitting having a first conical surface, said first conical surface being spaced from said open end of said outer tube;

biasing means located within said internal annular chamber, said biasing means applying a biasing force between said end fitting and said housing in a direction parallel to said longitudinal center axes, said biasing means tending to locate said housing in said retracted position; and an elastomerics and immovably collet fixedly mounted on said housing, said collet being located within said internal annular chamber, said collet being in binding engagement with said inner tube and said end fitting once said housing is in said retracted position preventing sliding movement between said inner tube and said outer tube, upon manual movement of said housing to said extended position said collet is located spaced from said end fitting not being in binding position with said inner tube permitting longitudinal sliding movement of said inner tube relative to said outer tube.

2. The telescopic tubes locking device as defined in claim 1 wherein:

said collet having a second conical surface, said second conical surface to engage with said first conical surface.

3. The telescopic tubes locking device as defined in claim 2 wherein:

said second conical surface being located at an angle at least one degree less than an angle of said first conical surface relative to said longitudinal center axes.

4. The telescopic tubes locking device as defined in claim 1 wherein:

said collet permitting lateral flexibility of said collet relative to said inner tube.

5. The telescopic tubes locking device as defined in claim 4 wherein:

said collet including a series of longitudinal slots which are spaced apart, said slots forming a plurality of deflectable fingers that directly engage with said inner tube, when said housing is in said retracted position said fingers are deflected into tight contact with said inner tube.

6. The telescopic tubes locking device as defined in claim 1 wherein:

an angle of said first conical surface to said longitudinal center axes being approximately fifteen degrees.

7. The telescopic tubes locking device as defined in claim 6 wherein:

an angle of said second conical surface to said longitudinal center axes being approximately fourteen degrees.

8. The telescopic tubes locking device as defined in claim 1 wherein:

said biasing means comprising a coil spring.

\* \* \* \* \*